United States Patent
Vasilenko

(10) Patent No.: US 11,116,143 B2
(45) Date of Patent: Sep. 14, 2021

(54) METHOD AND AN APPARATUS FOR STIMULATION OF PLANT GROWTH AND DEVELOPMENT WITH NEAR INFRARED AND VISIBLE LIGHTS

(71) Applicant: Vitabeam Ltd., London (GB)

(72) Inventor: Vladimir Vasilenko, Martintown (CA)

(73) Assignee: Vitabeam Ltd., London (GB)

( * ) Notice: Subject to any disclaimer, the term of this patent is extended or adjusted under 35 U.S.C. 154(b) by 622 days.

(21) Appl. No.: 15/807,087

(22) Filed: Nov. 8, 2017

(65) Prior Publication Data

US 2018/0070537 A1 Mar. 15, 2018

Related U.S. Application Data

(63) Continuation-in-part of application No. 15/561,331, filed as application No. PCT/US2016/024293 on Mar. 25, 2016, now abandoned.

(60) Provisional application No. 62/138,132, filed on Mar. 25, 2015.

(51) Int. Cl.
| | |
|---|---|
| A01G 7/04 | (2006.01) |
| H05B 45/20 | (2020.01) |
| F21Y 115/10 | (2016.01) |
| F21Y 113/10 | (2016.01) |
| F21V 23/02 | (2006.01) |
| F21S 4/24 | (2016.01) |
| H05B 47/16 | (2020.01) |
| A01G 9/20 | (2006.01) |
| F21Y 103/10 | (2016.01) |
| F21K 9/27 | (2016.01) |

(52) U.S. Cl.
CPC ............... *A01G 7/045* (2013.01); *A01G 9/20* (2013.01); *F21S 4/24* (2016.01); *F21V 23/02* (2013.01); *H05B 45/20* (2020.01); *H05B 47/16* (2020.01); *F21Y 2113/10* (2016.08); *F21Y 2115/10* (2016.08); *Y02B 20/40* (2013.01); *Y02P 60/14* (2015.11)

(58) Field of Classification Search
CPC .. A01G 7/045; A01G 9/20; F21S 4/24; H05B 45/20; H05B 47/16; F21V 23/02
USPC ..................................................... 47/58.1 LS
See application file for complete search history.

(56) References Cited

U.S. PATENT DOCUMENTS

| | | | | |
|---|---|---|---|---|
| 6,265,217 B1 * | 7/2001 | Chung | ................... | A01H 4/005 435/410 |
| 2010/0020536 A1 * | 1/2010 | Bafetti | ................... | H05B 45/00 362/231 |
| 2010/0301353 A1 * | 12/2010 | Pabst | ...................... | F21K 9/232 257/88 |
| 2011/0047867 A1 * | 3/2011 | Holland | ..................... | G01J 3/10 47/1.5 |
| 2011/0147617 A1 * | 6/2011 | Shur | ...................... | A01G 7/045 250/461.1 |
| 2011/0241549 A1 * | 10/2011 | Wootton | ............ | G02B 19/0028 315/117 |
| 2012/0218750 A1 * | 8/2012 | Klase | ...................... | F21V 5/007 362/231 |
| 2013/0127329 A1 * | 5/2013 | Komada | ............. | H01L 25/0753 313/498 |

(Continued)

*Primary Examiner* — Brady W Frazier
(74) *Attorney, Agent, or Firm* — Meunier Carlin & Curfman LLC

(57) ABSTRACT

A method and a device are provided to improve growth and production of various crop plants. The plants are exposed to a combination of photosynthetically active light and near infrared light.

6 Claims, 15 Drawing Sheets

(56) References Cited

U.S. PATENT DOCUMENTS

2014/0374780 A1\* 12/2014 Schaefer ............... H01L 33/507
                                                                                                 257/88
2016/0113213 A1\* 4/2016 Berinksy ................ H05B 47/19
                                                                                               47/58.1 LS \* cited by examiner

METHOD AND AN APPARATUS FOR STIMULATION OF PLANT GROWTH AND DEVELOPMENT WITH NEAR INFRARED AND VISIBLE LIGHTS

PRIORITY

This application is a Continuation-in-part application of U.S. application Ser. No. 15/561,331 filed on Sep. 25, 2017, which is a national phase application of PCT/US2016/024293 filed on Mar. 25, 2016 and claiming priority of a U.S. provisional application No. 62/138,132 filed on Mar. 25, 2015, the contents of all which are incorporated herein by reference.

FIELD OF THE INVENTION

This invention is related to providing growth light for horticultural and agricultural plants. More specifically the invention is related to use of near infrared light for promoting plant growth, production, and health.

BACKGROUND OF THE INVENTION

Infrared light is invisible "black" light and it is a part of the sunlight spectrum. Infrared light lies between the visible and microwave portions of the electromagnetic spectrum. Infrared light has a range of wavelengths, just like visible light has wavelengths that range from red light to violet. Infrared light can be divided into 'near infrared' and 'far infrared' regions. "Near infrared" light is closest in wavelength to visible light and "far infrared" is closer to the microwave region of the electromagnetic spectrum. Near infrared light consists of light just beyond visible red light in the wavelength region 750 nm-1400 nm. Far infrared waves are thermal, while near infrared waves are not. In other words, we experience infrared radiation every day in the form of heat. People, animals and many nonliving things emit infrared light—the Earth, the Sun, and far away objects like stars and galaxies do also. However, the significance of near infrared radiation (NIR) on the Planet has remained a mystery even for scientists until now.

Over the course of nearly two decades the inventor has been developing the theory and practice of application of infrared light in different areas of biology, agriculture, food production and storage of perishable products. His recent work opens a new vision to understanding the effects of NIR on living organisms. Now it is becoming clear that NIR is a messenger for some important information processes in plants and animals.

NIR affects the bio-organism at different levels. Electromagnetic impact of NIR influences at the tissue and organ level and causes the following effects:
1. Trigger of unknown infrared-light receptor and its transduction chain;
2. Influx of ions in the cells;
3. Increase of the respiration rate;
4. Change of phytohormones levels; and
5. Altered Gene expression—metabolism, growth and other macro-effects.

NIR works on the quantum level (effects the atomic and molecular level) as well as on the level of cells and tissues in plants.

Use of near infrared light is known to improve seed germination. UK patent GB 2 303 533 discloses treatment of seeds with near infrared light optionally in combination with red light. Typically, treatment of seed with wavelengths ranging from 800 to 1000 nm improved germination of seeds of various horticultural plant species. Moreover, the vigor of the seedlings was improved when the seeds were illuminated with the NIR. Typical duration of the illumination was 1 to 10 minutes.

Illuminating Avena-seedlings with 935 nm or 880 nm NIR continuously for 120 hours from planting have also been shown to have effect on the plant development (C. F. Johnson et. al.; Photochem. Photobiol. 1996, 63(2): 238-242). Seedlings grown in the presence of 880 nm irradiation were shorter and had a lower percentage of mesocotyl tissue compared to seedlings grown in darkness (no irradiation), while seedlings grown under 935 nm had less mesocotyl tissue and more coleoptile tissue than those grown without any irradiation.

Accordingly, it seems that near infrared light may have an active role in plant development, even if it has been postulated that because near infrared is outside the visible and far red regions of the electromagnetic spectrum, it would have no effects on plants. Actually, it has been proposed that near infrared light is harmful for plants (JP 2011000012) and therefore for example the Japanese patent application JP 2011000012 discloses a lighting system where the near infrared portion of the spectrum is specifically directed away from the plants.

Near infrared light does not significantly affect the temperature of the plant tissues, so there is no direct relationship between temperature and the effects of NIR on plants. Healthy vegetation absorbs blue-light and red-light energy to fuel photosynthesis and create chlorophyll. A plant with more chlorophyll will reflect more near-infrared energy than an unhealthy plant. Thus, analyzing a plant's spectrum of both absorption and reflection in visible and in infrared wavelengths can provide information about the plant's health and productivity.

Accordingly, the role of near infrared light in plant growth and development is somewhat unclear even if there are indications showing that near infrared light may have effects on plant growth and development. Many parties believe that NIR could inhibit plant growth; this is contrary to the surprising findings of this disclosure. Consequently, near infrared light is not used in commercial plant growth lighting systems. Moreover, the combination of visible light and near infrared light has not been tested. Nor has continuous NIR illumination been even considered as an option, perhaps partially due to the accepted notion of it being 'useless' or even 'harmful'.

Commercial plant cultivation in green houses is a major industrial activity of today's world. Year-round production of vegetables, fruits and flowers is an expected standard. Also, local production is a trend that is appreciated highly today. Accordingly, it has become necessary to produce plants in green houses and under artificial light to satisfy the consumers. Given that energy costs are high, the producers naturally look forward to any solutions that would increase the production without compromising quality. For these reasons there is a continuous need of lighting systems to improve plant productivity and health.

This invention provides methods and devices to increase the production of plants in greenhouse and in other artificially lit building environments.

SUMMARY OF THE INVENTION

Generally, this invention solves the problems described above and others not explicitly stated by using the method and device disclosed herein.

Accordingly it is an object of this invention to provide a method for stimulation of plant growth and production, which method comprises illuminating the plants with near infrared light from one or more LED/OLED (Organic Light Emitting Diodes) elements or other light generating technologies, with near infrared irradiation (NIR) in a range from 800 nm to 1000 nm, in certain aspects between 800 nm and 950 nm, in other aspects between 800 nm and 900 nm, and in some aspects between 840 nm to 960 nm.

It is another object of this invention to provide a method for stimulation of plant growth and production, which method comprises illuminating the plants with near infrared irradiation (NIR) from one or more LED elements, preferably with near infrared light wavelengths ranging from 840 nm to 960 nm preferably for at least 2 hours per day, more preferably in 8, 12 or 16-hour cycles. Continuous NIR illumination is also possible.

It is yet another object of this invention to provide a method for stimulation of plant growth and production, which method comprises illuminating the plants with near infrared light from one or more LED elements and simultaneous illumination with photosynthetically active radiation (PAR) and optionally combination of various wave lengths selected from the white light spectrum of 380 nm-700 nm emitted from one or more LED elements.

It is still another object of this invention to provide a method for stimulation of plant growth and production, which method comprises illuminating the plants with near infrared light from one or more LED elements with near infrared light in a range from 800 nm to 1000 nm, 800 to 950 nm, or 840 to 960 nm, and simultaneous illumination with a combination of warm white light (3000-3500K) and cool white light or daylight (5000-7000K) of the wavelengths range 400 nm-700 nm.

A further object of this invention is to provide a method for stimulation of plant growth and production which method comprises illumination with near infrared and selected combinations of wavelengths from white light spectrum such as 380 nm, 450 nm, 600 nm, and 660 nm, wherein the radiant output of the near infrared LED elements is at least 5% of the total radiant output.

Yet another object of this invention is to provide a method for stimulation of plant growth and production which method comprises illumination with near infrared and selected combinations of wavelengths from white light spectrum, wherein the radiant output of the near infrared LED elements is at least 5% of the total radiant output, and the selection of wavelengths is a combination of UV-A, UV-B, violet, blue, green, orange and red colors of the wavelengths range 400 nm to 700 nm.

It is yet another object of this invention to provide a method and device to improve in vitro plant propagation by illuminating the explants transferred on culture medium with a combination of near infrared and selected combinations of wavelengths from white light spectrum such as 450 nm, 660 nm and 730 nm. UV A and/or UV B light may be added to the combination.

Another object of this invention is to provide a method and device to enhance, stimulate and prolong plant flowering by illuminating the plants with a combination of near infrared and selected wavelengths from the white light spectrum.

Still another object of this invention is to provide a method and device to stimulate growth and production of medical cannabis by illuminating the plants with a combination of near infrared, red light and blue light. The light selection may also be amended by UV-B and/or UV-A irradiation.

Still another object of this invention is to provide a device for illuminating plants using NIR wavelengths in spectrum, wherein the device comprises one or more LED elements and a power for the LED elements, wherein said LED-elements comprise a near infrared LED element, preferably an infrared LED element within a range from 840 nm to 960 nm.

It is another object of this invention to provide a device for illuminating of in vitro plantlets using NIR in combination with selected combination of wavelengths from the white light spectrum.

A further object of this invention is to provide a device for illuminating of plants using NIR light, wherein the device comprises one or more LED elements and a power for the LED elements, wherein said LED-elements comprise a near infrared LED elements and white light elements, and wherein the white and near infrared LED-elements are included in an alternating manner preferably in an elongated panel or string in the direction of elongation.

Yet another object of this invention is to provide a device for illuminating plants using NIR, wherein the device comprises one or more LED elements and a power for the LED elements, wherein said LED-elements comprise near infrared LED elements and white light elements, and wherein the white and near infrared LED-elements are included in an alternating manner in a preferably elongated panel or string in the direction of elongation and wherein the number of white light LED elements in the device is larger than the number of near infrared-elements.

It is another object of this invention to provide a device for illumination of plants using NIR, wherein the device comprises one or more LED elements and a power for the LED elements, wherein said LED-elements comprise infrared LED elements and white light elements, and wherein the white and near infrared LED-elements are included in alternating manner in a preferably elongated panel or string in the direction of elongation, and wherein the radiant output of the near infrared LED elements is in 5% to 25% range of the total radiant output.

A further object of this invention is to provide a device for illuminating plants using NIR wavelengths in the spectrum in combination with other colors of photosynthetically active radiation (PAR), wherein the device allows for tuning the light spectrum in accordance with plant's needs based on its developmental stage or based on time of the dark/light cycle allowing more red or blue or near infrared rays in the spectrum.

Yet another object of this invention is to provide a device for illuminating plants using NIR wavelengths in spectrum in combination with other colors of PAR, wherein the device allows to tune the light spectrum in accordance with natural daily changing of the sunlight spectrum that automatically change the percentage of red, blue, green or infrared wavelengths in the spectrum or turns the light on and off in accordance with time of a day for 24 hour cycle.

These and other embodiments will be better understood in conjunction with the drawings and description that follow.

A BRIEF DESCRIPTION OF THE DRAWINGS

Various aspects of the invention will now be described, by way of example, with reference to the accompanying drawings, in which:

FIG. 1 shows reflectance of healthy and unhealthy vegetation. It can be seen that in the NIR region the unhealthy plants reflect much less than the healthy plants. This means that the absorption of NIR wavelengths is higher by unhealthy plants than the healthy ones. Unhealthy plants may absorb up to 60% of the NIR region light depending on the degree of their damage.

FIG. 2 shows the typical spectrum of commercially available grow lights. The current level of technology provides lighting systems that lack green and yellow lights and none of the current systems include NIR.

FIG. 3 shows an example of spectrum of grow lights according to an aspect of this invention. The spectrum includes cool white (5000K) and warm white (3500K) LED and near infrared LED elements emitting between 875 and 975 nm with a peak around 930 nm.

Figure 5:
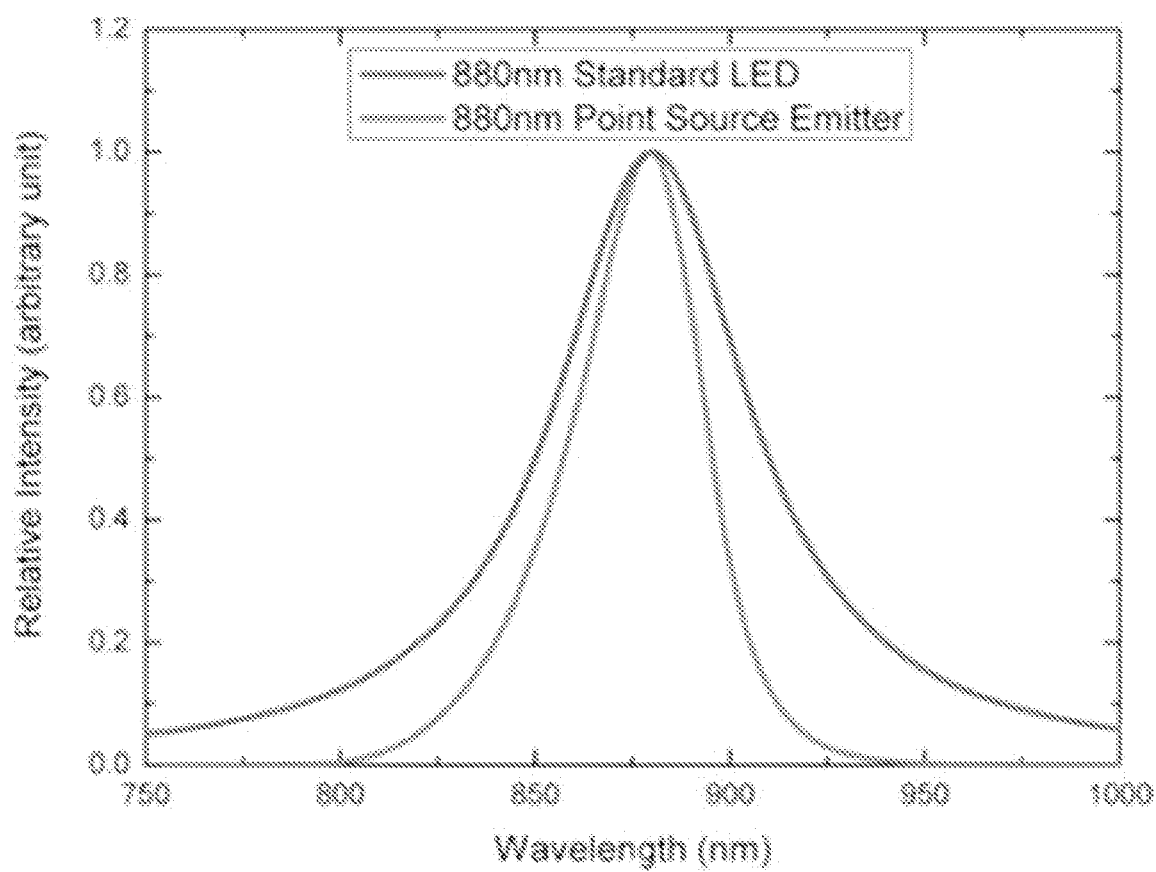
FIG. 5 shows an example of a spectrum and radiant output of standard near infrared LED with peak emission at 880 nm and a point source emitter similarly with a peak at 880 nm, both of which may be used in the device and method of this disclosure.
Figure 6:
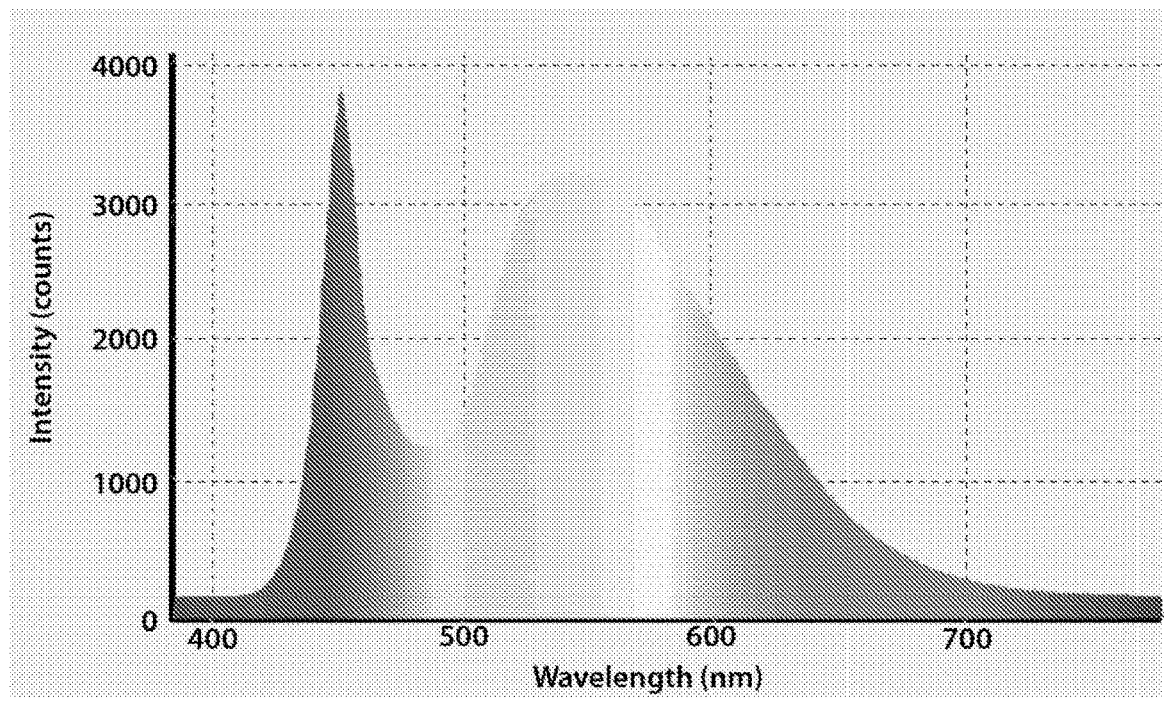

FIG. 6 shows an example of spectrum and radiant output of one embodiment of cool white LED element of this invention. These elements are used in combination of near infrared LED elements (e.g. FIGS. 4 and 5) and/or with warm white LED elements (e.g. FIG. 7).

Figure 7:
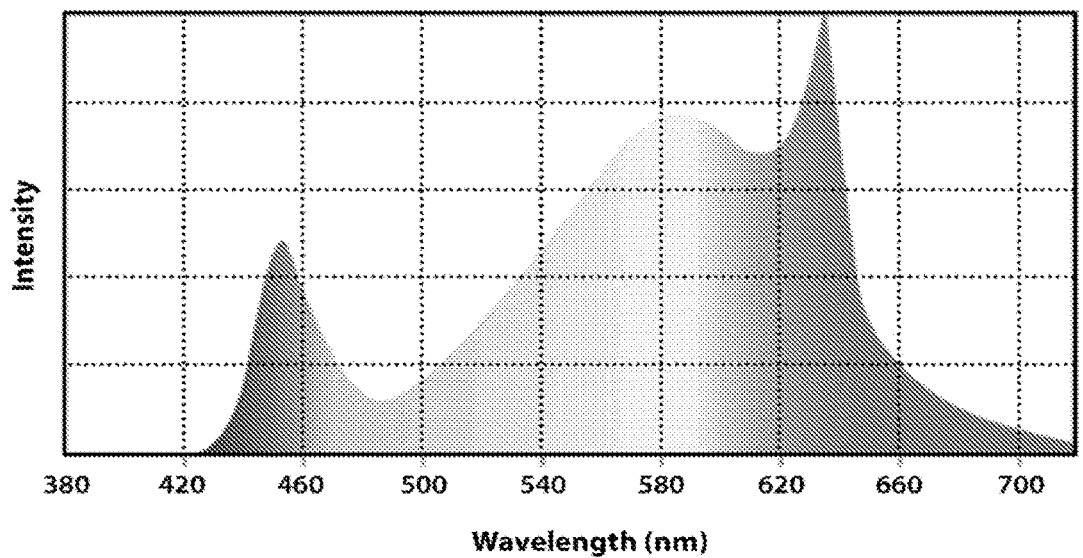

FIG. 7 shows an example of spectrum and radiant output of one embodiment of warm white LED element of this disclosure. These elements are used in combination of near infrared LED elements (e.g. FIGS. 4 and 5) and/or with cool white LED elements (e.g. FIG. 6).

Figure 8:
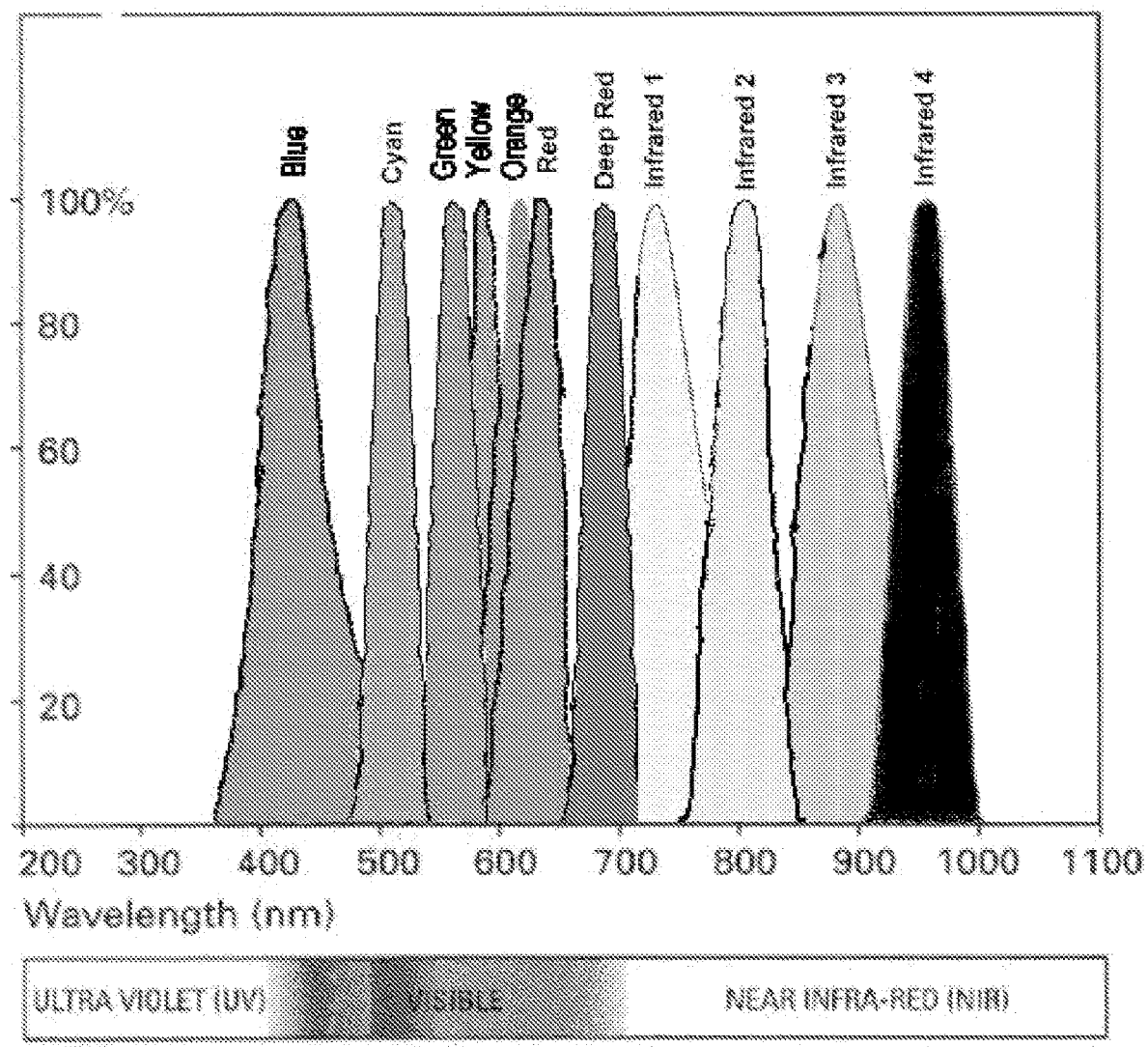

FIG. 8 shows an example of one embodiment of the invention where the white light comprises spectra emitted from a number of LED elements of various color of the PAR spectrum and the NIR is emitted from several near infrared LED elements with different wavelengths.

Figure 9:
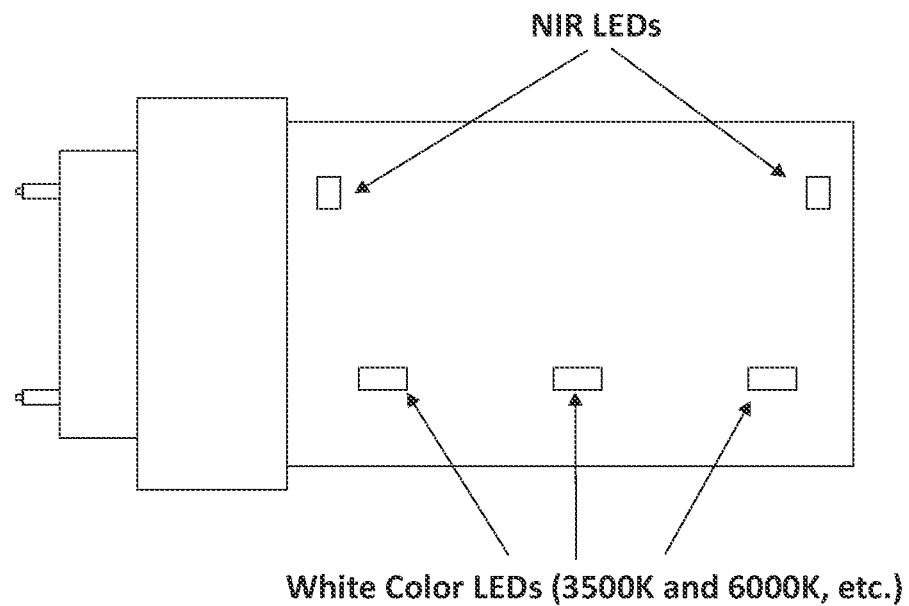

FIG. 9 shows an example of a grow light device according to this disclosure. The device comprises of near infrared LED elements and white color LED elements where the white color LED elements may emit the same or different wavelengths, which may be cool white LED elements emitting spectra such as in FIG. 6 or may be warm white color LED emitting a spectra such as in FIG. 7.

Figure 10:
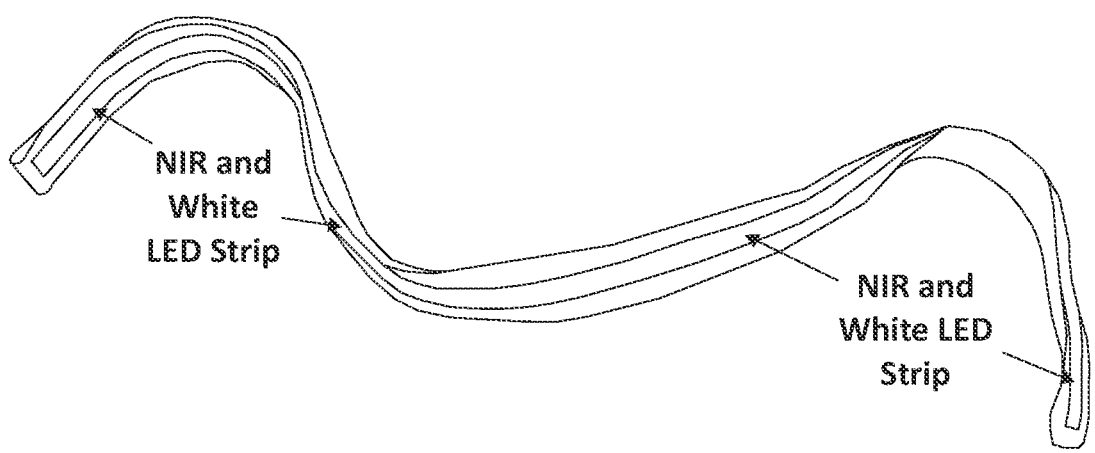

FIG. 10 shows an embodiment of the grow light device according to this invention. The device comprises near infrared LED elements and white color LED elements and the device is flexible.

Figure 11:
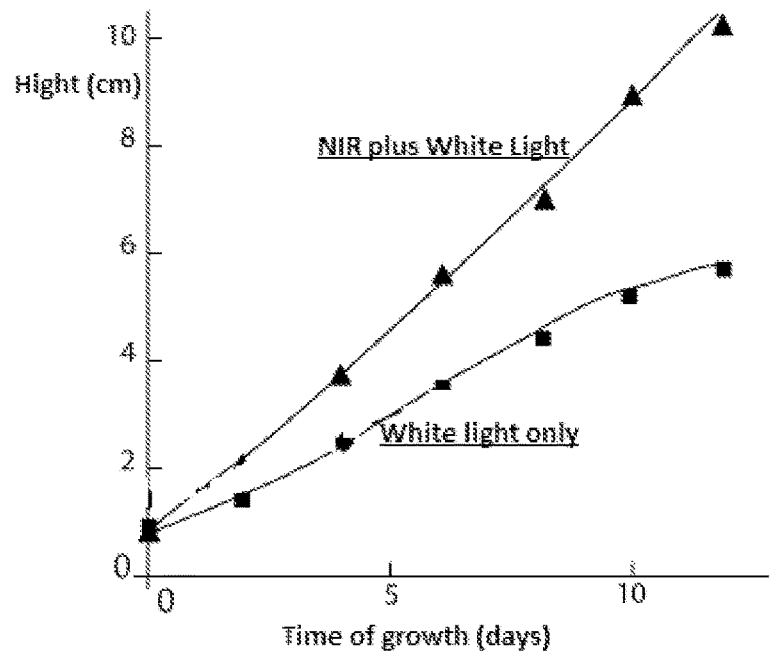

FIG. 11 shows the effect of NIR and photosynthetically active radiation for growth rates of seedlings of various plant species. The curve represents typical results obtained with tomato, wheat, corn, geranium and fuchsia seedlings.

Figure 12:
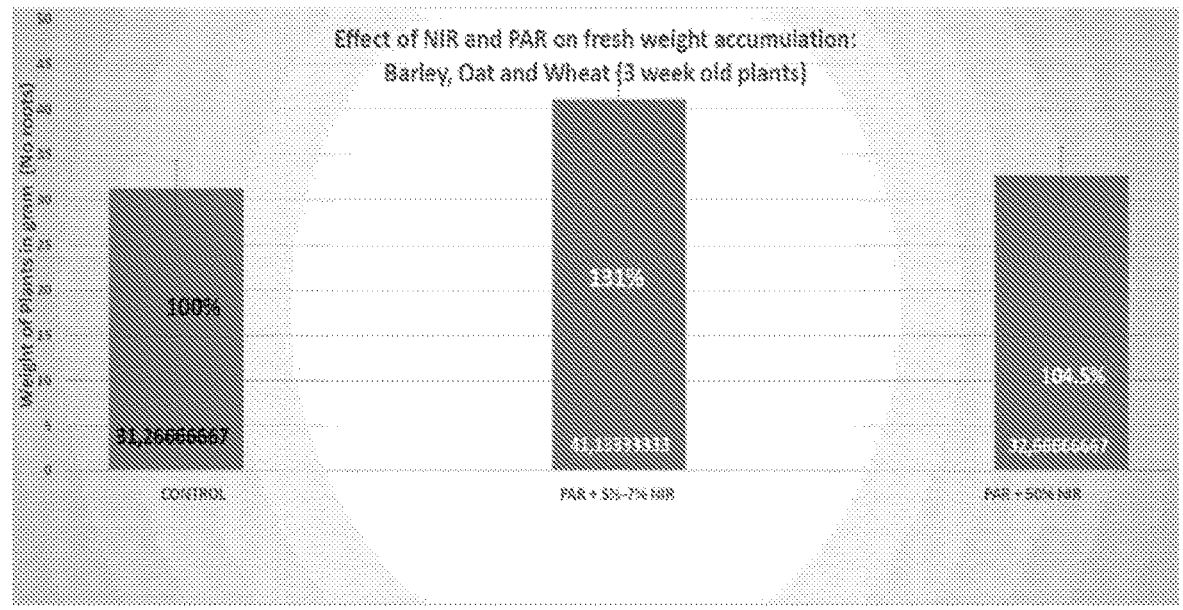

FIG. 12 shows effect of NIR and PAR on fresh weight accumulation of barley, oat and wheat.

Figure 13A:

FIG. 13a shows effect of PAR and NIR on growth of cucumber seedlings. Six weeks old cucumber plants grown under a source of PAR only (4 plants on left) and under grow light with PAR+NIR (4 plants on right).

Figure 13B:
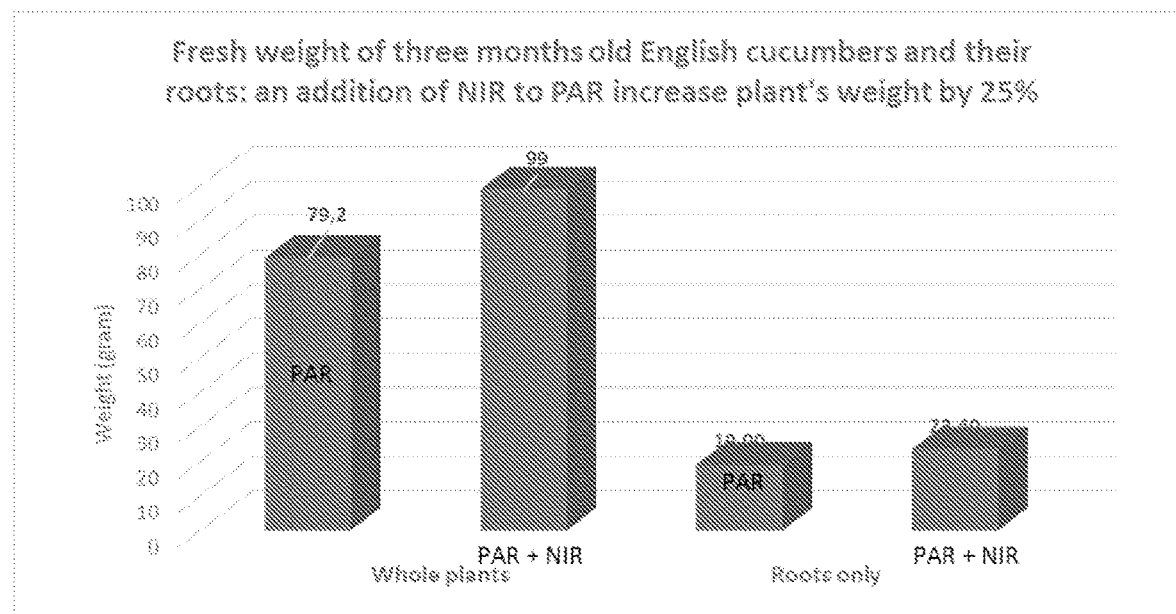

FIG. 13b shows fresh weight of three months old cucumber plants (whole plant and roots only).

Figure 14:

FIG. 14 shows two months old peppermint plants grown under a source of PAR only (plant on the left) and under grow light with PAR+NIR (2 plants on right).

Figure 15A:

FIG. 15a shows effect of PAR only (four plants on the right) and PAR+NIR (four plants on the right) on growth of bell pepper plants.

Figure 15B:
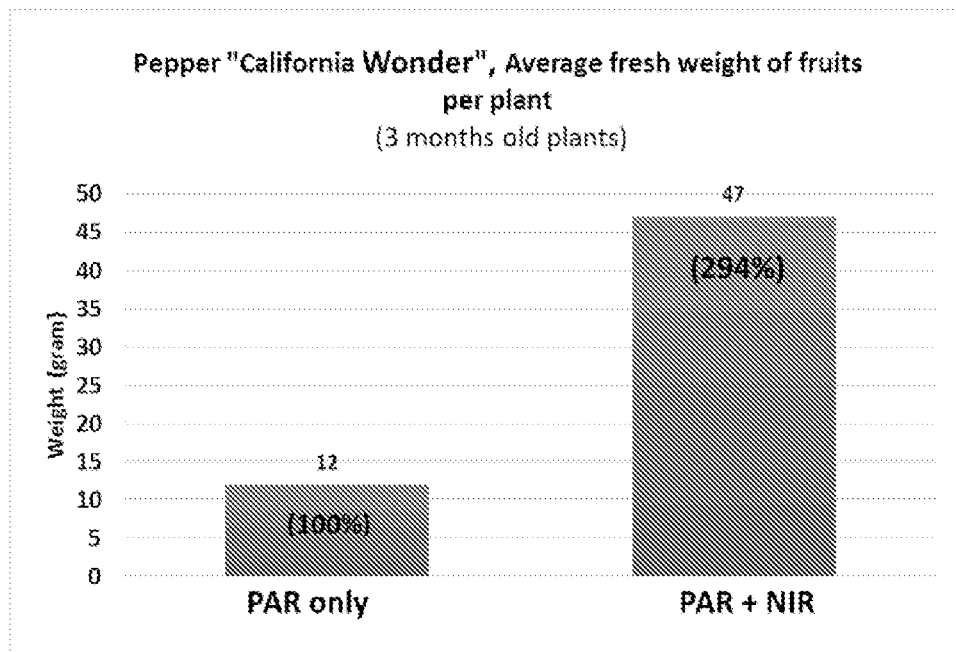

FIG. 15b shows the fresh weight of fruits of three months old bell pepper plants grown under a source of PAR only or under PAR+NIR.

Figure 15C:
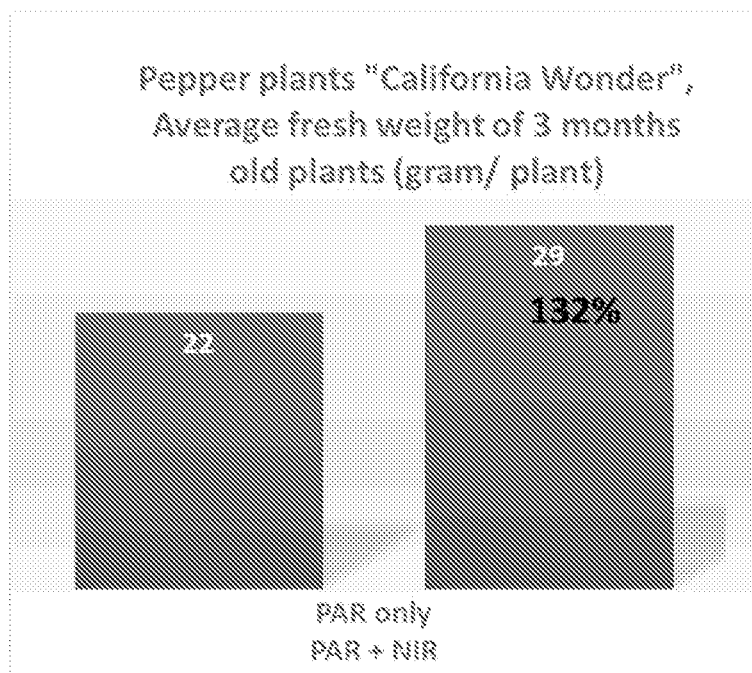

FIG. 15c shows the average fresh weight of 3 months old bell pepper plants grown under a source of PAR only or under PAR+NIR.

Figure 15D:

FIG. 15d Shows harvested bell peppers grown under a source of PAR only (left) or under PAR+NIR (right).

Figure 16:
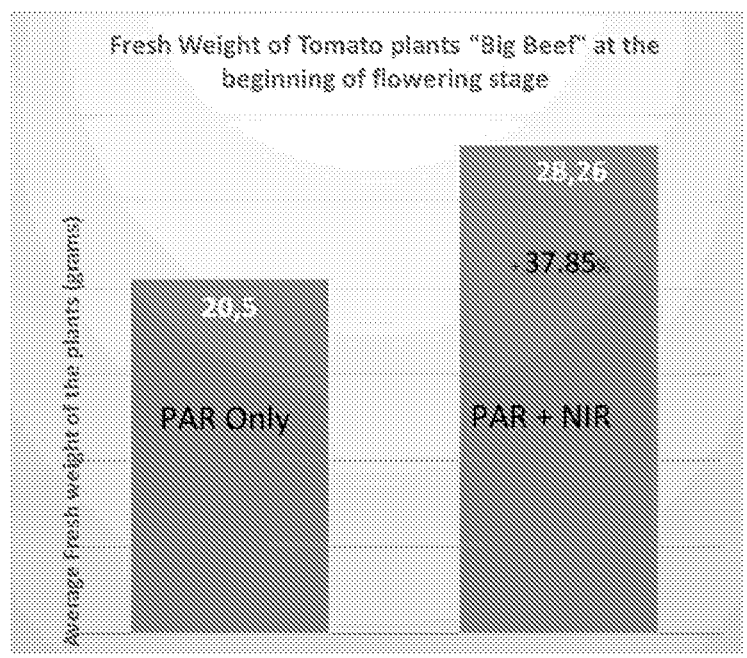

FIG. 16 shows fresh weight of tomato plants at the beginning of flowering stage grown under a source of PAR only or under PAR+NIR.

Figure 17:
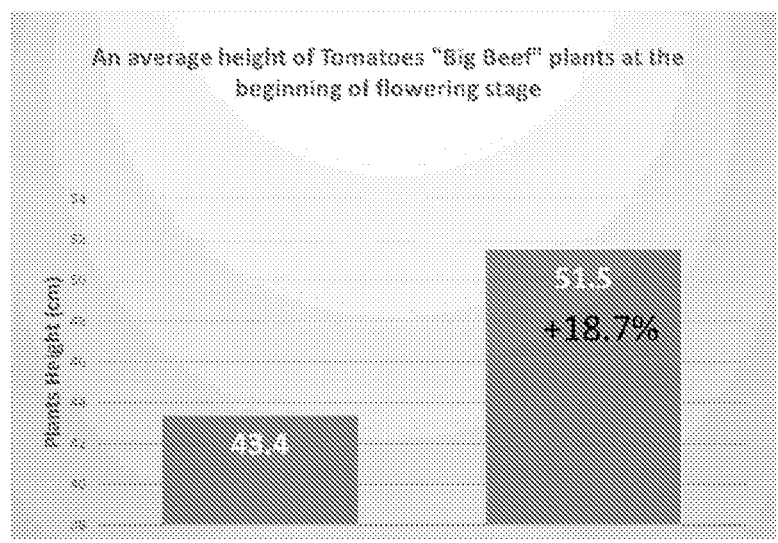

FIG. 17 shows average height of tomato plants at the beginning of flowering stage grown under a source of PAR only or under PAR+NIR.

DETAILED DESCRIPTION OF THE INVENTION

Definitions

By far infrared it is meant wavelengths above 1400 nm.
By near infrared it is meant wavelengths 750-1400 nm.
By visible lights it is meant wavelengths 390-750 nm.
By photosynthetically active radiation (PAR) it is meant wavelengths 400-700 nm.
By blue light it is meant wavelengths 380-495 nm.
By ultraviolet light it is meant wavelengths 10-380 nm.
By ultraviolet A light it is meant wavelengths 350-400 nm.
By ultraviolet B light it is meant wavelengths 280-315 nm
By orange light it is meant wavelengths 590-620 nm.
By red light it is meant wavelengths 600-700 nm.
By far red light it is meant wavelengths 700-750 nm.
By green light it is meant wavelengths 495-590 nm.
By yellow light it is meant wavelengths 570-590 nm.
By cool white light it is meant the light with correlated color temperatures* of 5000-6000K.

*Correlated Color temperature (CCT) in lighting describes how the color of the light appears from a lamp, measured in Kelvins (K).

By warm white light it is meant the light with correlated color temperatures of 2700-3500K.

In the present context, the terms 'LED', 'LED element' and 'light emitting diode' are used interchangeably and refer to light emitting diodes in all known forms, be it inorganic, organic, point-like, or line-like. In one aspect of the invention, the LEDs are wide angle elements, which refer to LEDs which deliver evenly spread light rather than spotlights. The LEDs may be used in high power output and emit continuously.

The present invention relates to a method for growing plants with usage of artificial LED light. The method comprises providing a lighting system to illuminate a plant with a combination of near infrared and visible light. Compared to other types of grow lights, the method and device of this invention helps the plants to grow much faster because of their unique spectra. There are multiple absorption peaks for chlorophyll and carotenoids and phytochrome, and the light and device of this invention (herein called Vitabeam GROW™) employ the special wavelengths rays overlapping these peaks. The device emits the wavelengths of light corresponding to the absorption peaks of a plant's typical photochemical processes.

Figure 1:
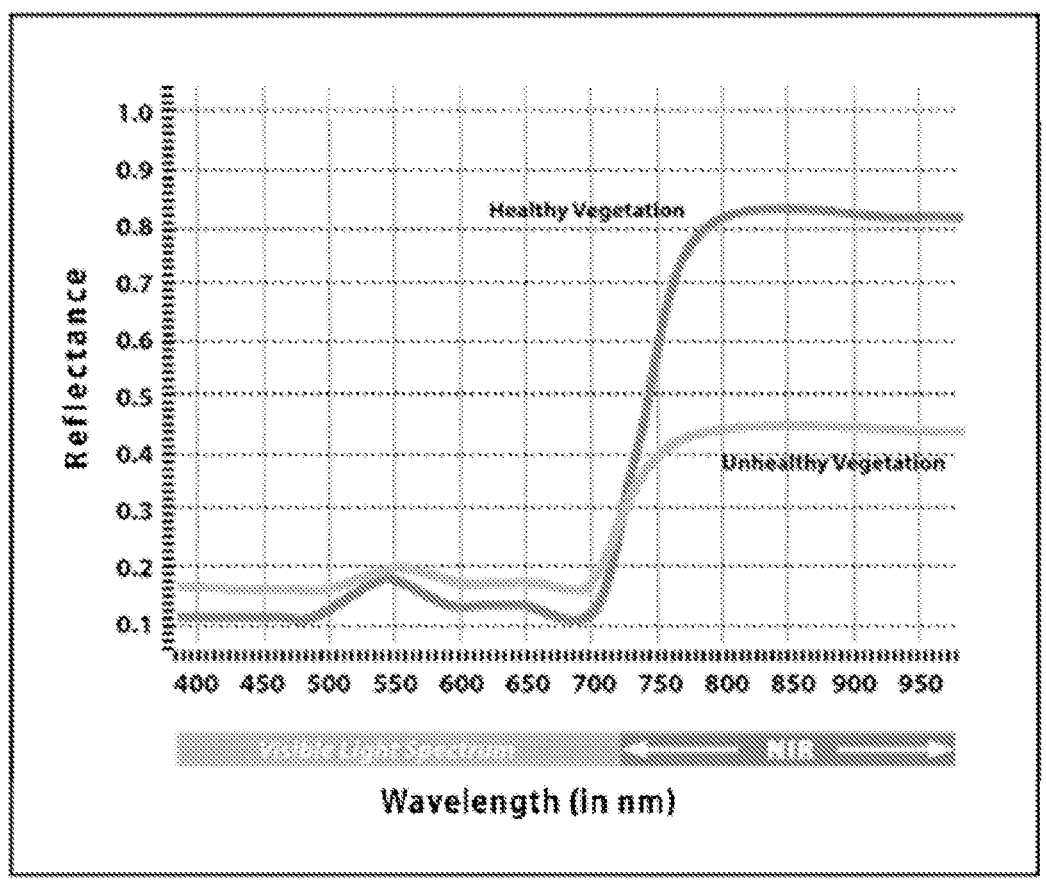

Near Infrared light has been vastly used for remote sensing. Remote sensing has been used for the detection of vegetation, stage of growth and health of the vegetation. Healthy plants can be identified by using the near infrared spectrum because they reflect most of it (around 80%), whereas unhealthy plants reflect much less NIR. Thus, plant stress is indicated by progressive decrease in NIR reflectance. This is schematically shown in FIG. 1. Based on this information it seems that the green plants need NIR light for certain physiological and biochemical processes related to their growth, development and for reparation of damaged tissues. This is why unhealthy plants need more near infrared light; as less of it is emitted. NIR activates metabolism in plants and their damaged tissues, possibly, in a similar way as it probably does in animals and human tissues. One of the mechanisms of NIR action involves the cell's respiration system located in the mithocondria. However, as discussed above NIR has been considered as 'useless' or even 'harmful' for plants.

Figure 2:
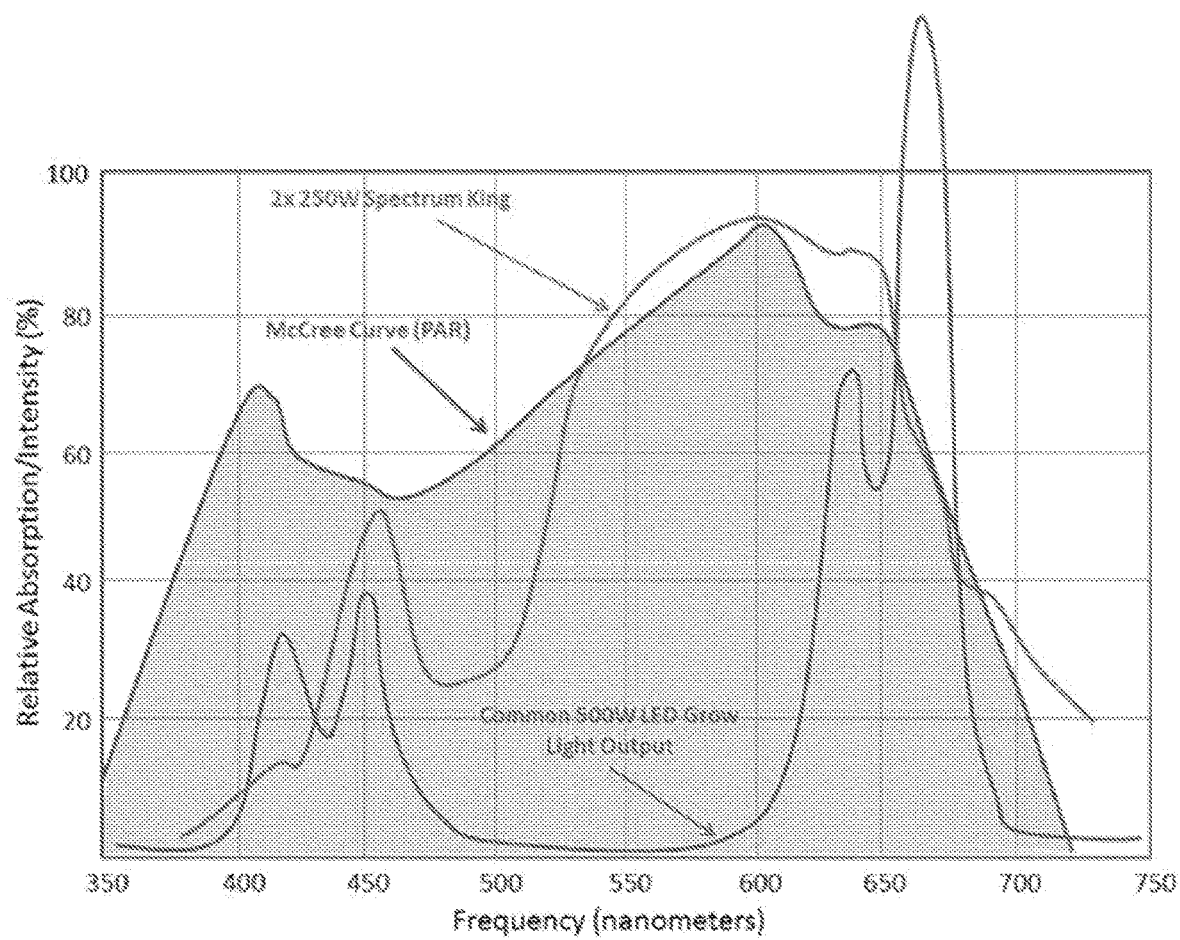

Photosynthetically active pigments absorb red light between about 600 and 700 nm. Phytochromes are known to be essential for plant sensing of light and they absorb red and far red light (around 750 nm). Some plant pigments absorb light in the blue light region. Green light is known to be the least active of the visible light. For these reasons grow lights provided for plants usually have a spectrum including blue and red lights, sometimes far red light, and usually no green light wavelengths. FIG. 2 shows a typical spectrum of commercially available lighting systems. No specific pigment is known to absorb NIR.

More recently there has been research showing that plants at different developmental stages grow better with different red/blue ratios. WO 2013/188303 shows a lighting system where the ratio of red and blue can be modified depending on the developmental stage of the plant.

There are no commercially available lighting systems or any disclosures showing use of NIR emission in combination of color spectrum selected from the white light spectrum. Nor is a system disclosed where the color spectrum would change over the course of the day while maintaining the level of NIR throughout the illumination period or selected parts of the illumination period.

Figure 3:
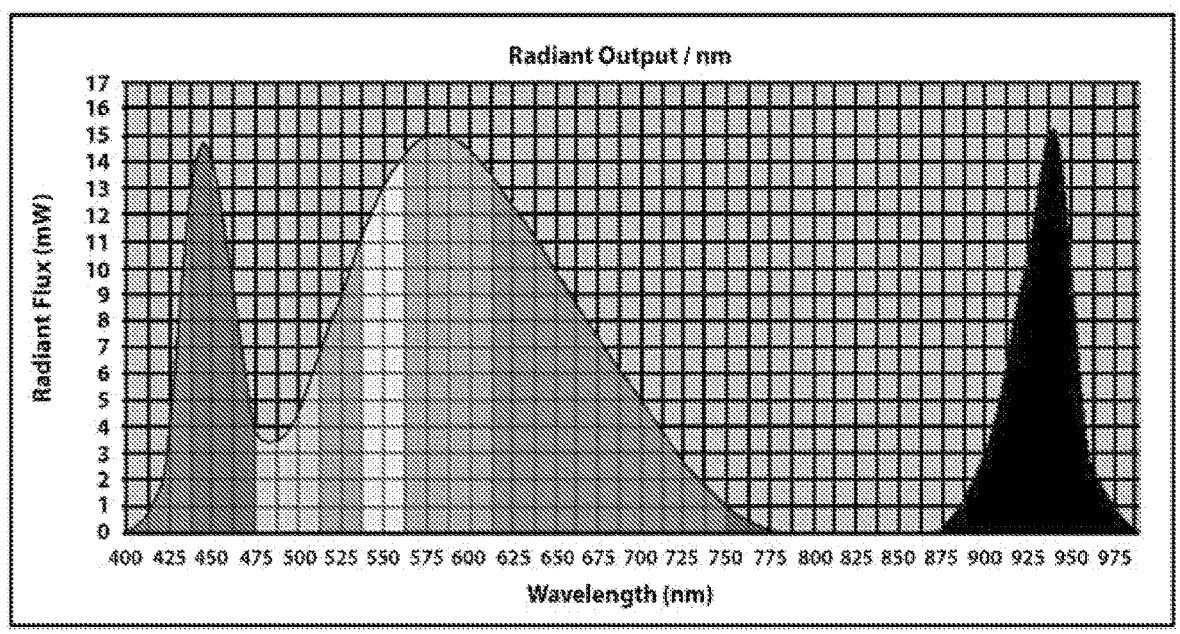

This disclosure provides a lighting system where NIR is an essential part of the spectrum. Referring to FIG. 3, an example of spectrum of grow lights according to this invention is provided. The spectrum includes cool-daylight white (5000-7000K) and warm white (3000-3500K) LED and near infrared LED elements emitting between 875 nm and 975 nm with a peak around 930 nm. The NIR wavelengths may also be between 800 nm and 900 nm or between 800 nm and 950 nm.

Figure 4:
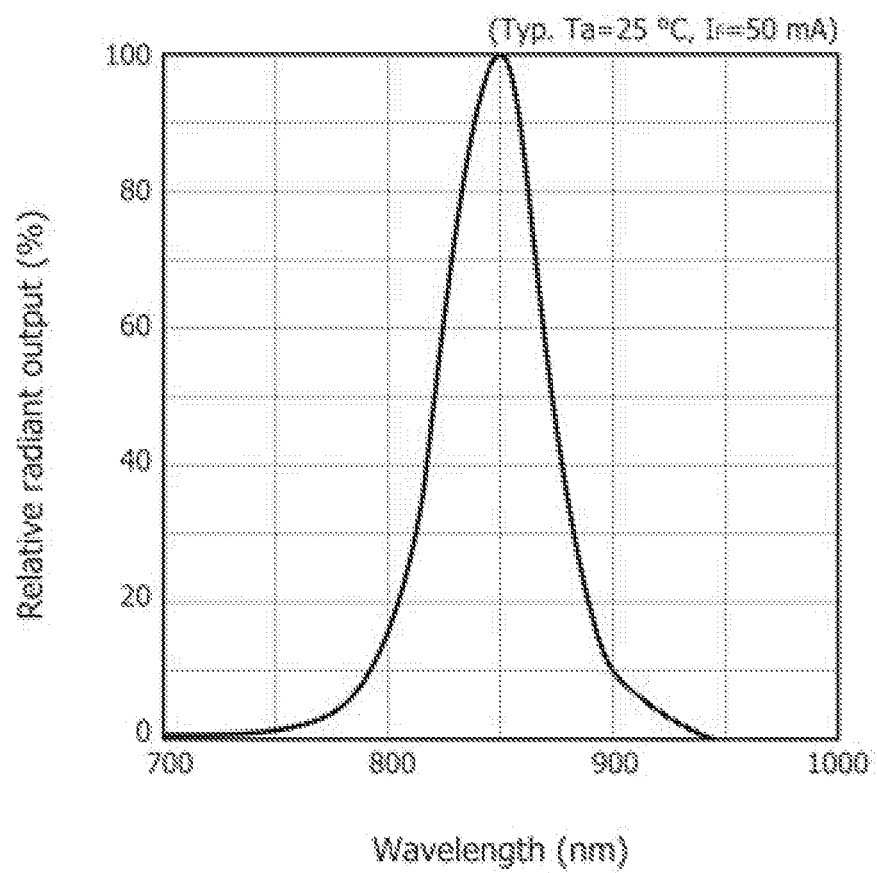
FIG. 4 shows an example of a spectrum and radiant output according to one aspect near infrared LED elements of this invention. The LED emits between 775 and 925 nm with peak at 850 nm.

The NIR emission may be provided by a near infrared LED element having an emission spectrum as is shown in FIG. 4, with a peak at 850 nm. The NIR emission may be provided by a near infrared LED with peak at 880 nm or by a source emitter with a peak at 880 nm, as is shown in FIG. 5.

The NIR emission peak may be in between wavelengths 850 and 960 nm.

The lighting system of this invention additionally has a visible light spectrum, which may be as is shown in FIG. 6 where the visible spectrum is cool white spectrum (wavelengths between 380 nm and 750 nm.) or as is shown in FIG. 7 where the visible spectrum is warm white spectrum (wavelengths between 420 and 720 nm). As an example, a combination of two spectra (two types of white LED lights) gives the "universal" spectrum that fits to the most requirements for plant photosynthesis, optimal growth and yield.

The visible spectrum may be also composed of spectra emitted from a number of LED elements of various colors of PAR spectrum such as shown in FIG. 8. Similarly, the NIR spectrum may be composed of NIR emitted from various near infrared LEDs with different peak wavelengths as are shown in FIG. 8 for example.

In some aspects of the invention the lighting system of this disclosure may also include ultraviolet light. The ultraviolet light may be at wavelengths of 350 to 400 nm. In some aspects ultraviolet B light may be included with or without ultraviolet A light.

In reference to FIG. 9, the grow light device according to this invention may be a LED tube comprised of one or more near infrared LEDs and one or more white color LEDs. Preferably the number of white color LEDs is larger than the number of near infrared LEDs.

FIG. 10 shows a variation of the device where the grow light device is made on a flexible material. This allows locating the light inside a plant canopy and allows using the device in small or irregular spaces. According to one aspect the color LEDs and near infrared LED elements are included in the device in an alternating manner in an elongated panel or a string in the direction of elongation.

The number of near infrared LED elements and the number of white light LED elements in the device may vary depending on the form of the device and the application for which they are used. In one aspect, the number of white light LED elements is larger than the number of near infrared LED elements.

The ratio of white light LED elements to near infrared LED elements may vary depending on the application and the form of the device. Preferably the number of white light LED is 4 to 20 times larger than the number of near infrared LED elements. In some aspects the number of white light LED is 5-15 times larger than number of near infrared LED elements. In one aspect of the invention number of colored LED elements, such as blue, yellow, green, and red, is 4 to 20 times larger than the number of near infrared LED elements. In some aspects the number of colored LED is 5-15 times larger than number of near infrared LED elements.

The power output of the LEDs may be adjusted in any convenient way. In one embodiment, the output is adjusted per type of specific wavelength. The radiant output of the LEDs is preferably at least 10 mW, more preferably, it is at least 50 mW, at least 100 mW, at least 500 mW or at least 1 W. More preferably, the LEDs are high power LEDs with a radiant output of at least 5 W, at least 10 W, at least 15 W, at least 20 W, at least 25 W, at least 30 W, at least 35 W or at least 40 W. In one embodiment, the LEDs are high power LED elements with a light intensity of at least 100 mW/cm$^2$, at least 200 mW/cm$^2$, at least 300 mW/cm$^2$, at least 400 mW/cm$^2$, at least 500 mW/cm$^2$ or at least 1000 mW/cm$^2$, in continuous mode. In greenhouses, supplementary PAR level is preferably ranging from 3 W/m$^2$ for ferns and other low light crops, to 20 W/m$^2$ for vegetable crops and propagation areas. For example, the device illuminates a crop at least 2 W/m$^2$, more preferably 5 W/m$^2$ or at 10 W/m$^2$ for 18 hours or at least 15 W/m$^2$ or at least 20 W/m$^2$, or at least 50 W/m$^2$ or at least 100 W/m$^2$. The duration of light exposure is for at least 2 hours, preferably at least 8 hours, more preferably at least 12 hours, most preferably 16 hours, 18 hours, or 24 hours.

The white color LEDs may emit different wavelengths. There may be cold white LEDs emitting spectra such as in FIG. 6 or there may be warm white color LED emitting spectra such as in FIG. 7.

In one aspect of the invention the NIR emitted is in a range from 800 to 1000 nm. Preferably the NIR is in range of 840 and 960 nm. In some aspects of the invention the NIR is in range of 860 to 900 nm.

According to one embodiment the NIR is provided in combination with warm white light (3000-3500K) and cool white light (5000-7000K) at wavelengths of 400 to 700 nm. There are two approaches to create white light. One approach is to mix the light from several colored LEDs (FIG. 8) to create a spectral power distribution that appears white.

Another approach to generating white light is the use of phosphors together with a short-wavelength LED. For example, when one phosphor material used in LEDs is illuminated by blue light, it emits yellow light having a fairly broad spectral power distribution. By incorporating the phosphor in the body of a blue LED with a peak wavelength around 450 to 470 nm, some of the blue light will be converted to yellow light by the phosphor. The remaining blue light, when mixed with the yellow light, results in white light. New phosphors are being developed to improve color rendering as shown in FIGS. 6 and 7.

According to one aspect of the invention the radiant output of the near infrared LED elements is between 1 and 50% of the total output. More preferably the output near infrared LED element is at least 2%, more preferably at least 5% and most preferably it is between 5 and 25%.

According to one aspect of the invention the device of this invention allows for tuning the light spectrum in accordance with plant needs allowing more red or blue or NIR rays in the spectrum. This tuning may be done manually or automatically based on the developmental stage of the plant or based on the natural daily changing of sunlight, or based on the time of day. According to one aspect of the invention software is provided with the lighting system that allows programming of a relay circuit board. According to a one aspect each individual spectrum can be controlled with sequenced events allowing customization of intensity and duration of each specific spectrum. According to one aspect the system automatically changes the percentage of red, blue, green and NIR wavelengths according to the time of the day in a 24-hour cycle. The device may allow for tuning the light spectrum in accordance with natural daily changing of sunlight spectrum that automatically change the percentage of red, blue, green or near infrared wavelengths in the spectrum or turn the light on and off in accordance with time of day within a 24-hour cycle. In one aspect an individual spectrum can be controlled with up to 999 time sequenced events, thereby allowing for maximum customization to the required intensity and duration of each specific spectrum.

This invention provides a device and a method to improve crop growth, yield and health by means of illuminating the plants with a combination of NIR and visible light. The plants may be selected from crop plants, medical plants, or flowering plants. The plants may be monocotyledons or dicotyledons, algae or ferns. The plants may be selected from at least the following species: avocado, barley, oat, rye, corn, strawberry, blueberry, raspberry, potato, tomato, cabbage plants, leguminous plants, cucumbers, peppers, bulbiferous plants, cannabis, fuchia, geranium, chrysanthemum, rose, tulip, and amaryllis. Various other plant species can also benefit from the method described in this disclosure. The plants may be grown in vivo or in vitro; they may grow in hydroponic culture, or in soil.

The positive effects of the NIR and visible light may be measured for example as increased biomass, increased number of flowers or leaves, increased size or number of fruits or berries, improved content of biochemical naturally occurring in a plant species, earlier flowering, longer lasting flowering, and/or earlier production of crop.

The invention is now described in light of illustrative but non-limiting examples.

Example 1. Synergistic Effect of NIR and White Light on Plant Growth

Seeds of various plant species (tomato, wheat, corn, fuchsia, Geranium, etc.) were germinated in darkness. Once germinated the seedlings were transferred under a lighting device shown in FIG. 9. The device comprised near infrared LED elements and white color LED elements in the PAR wavelength region. For example, a device wherein the white and near infrared LED-elements are included in alternating manner in an elongated panel or string in the direction of elongation wherein the number of white light LED elements in the device is larger than the number of near infrared-elements. More specifically, a device wherein the white light LED-elements comprise a 3500 K LED element and a 6500 K LED element wherein NIR of 850 nm maximal output (800 nm-900 nm range) or 880 nm maximal output (800 nm-950 nm range). The radiant output of the LED elements is preferably at least 10 mW, more preferably, it is at least 50 mW, at least 100 mW, at least 500 mW or at least 1 W. More preferably, the LEDs are high power LEDs with a radiant output of at least 5 W, at least 10 W, at least 15 W, at least 20 W, at least 25 W, at least 30 W, at least 35 W or at least 40 W. In one embodiment, the LEDs are high power LED elements with a light intensity of at least 100 mW/cm$^2$, at least 200 mW/cm$^2$, at least 300 mW/cm$^2$, at least 400 mW/cm$^2$, at least 500 mW/cm$^2$ or at least 1000 mW/cm$^2$, in continuous mode. In greenhouses, supplementary PAR level is suggested ranging from 3 W m$^2$ for ferns and other low light crops, to 20 W m$^2$ for vegetable crops and propagation areas. For example, the device illuminates a crop at least 2 W/m2, more preferably 5 W/m$^2$ or at 10 W/m$^2$ for 18 hours or at least 15 W/m2 or at least 20 W/m2 or at least 50 W/m$^2$ or at least 100 W/m$^2$. The duration of light exposure was for at least 12 hours, more preferably 16 hours, 18 hours, or 24 hours.

TABLE 1

Typical Supplementary Illumination Treatments (h) for Commercial Greenhouse Crops (various sources):

| Crops | "Long-term" range of the treatments | "Short-term" range of the treatments |
|---|---|---|
| TOMATOES (propagation) | 12-24 | 8-15 |
| CUCUMBERS (propagation) | 12-24 | 8-15 |
| PEPPERS (propagation) | 12-24 | 8-15 |
| FOLIAGE PLANTS | 12-24 | 3-6 |
| BEDDING PLANTS | 12-24 | 5-15 |
| CHRYSANTHEMUMS | 12-24 (long days) <12 (short days) | 5-15 |
| ROSES | 18-24 | 5-8 |

Control plants were under white color LEDs whereas the experimental plants were under a combination of NIR and white light. The spectrum of the white color LEDs was identical for both control and experimental plants. The day/night cycle was programmed to be 8 h night 16 h daylight. The growth of the seedlings was monitored by measuring the fresh and dry weight (biomass) of the seedling for a period of 14 days. The results consistently showed the NIR+white light at PAR wavelengths improving the growth of the plants as compared to the control plants grown in white color light of PAR only. FIG. 11 shows a typical growth curve of the plantlets.

Example 2. Effects of Combination of NIR and PAR on Growth and Flower Production of Cucumber Plants Plants were grown in plastic pots with soil mix with a daily addition or water nutrient solution NPK+ micronutrients (calcium, magnesium, boron, copper, iron, etc.). Young plantlets were placed at a distance of 12-16 inches from grow light. The control grow light was PAR only, and Experimental light PAR+NIR Plants were harvested three months after start of the experiment. Control grow light was LED light 400 nm-700 nm (PAR only) light spectrum of three color temperatures—3500K, 5000K and 6500K; NIR Grow Light was same LED light same as Control with two wavelengths of NIR-870 nm Max and 940 nm Max.

FIG. 13a shows six weeks old cucumber plants grown under control of PAR only (4 plants on left) and under grow light with Experimental PAR+NIR (4 pots on right).

Table 1 below shows number of flowers per plant after 2 months. The number of flowers and buds was on average higher in plants grown under experimental light (PAR+NIR)

|  | Control (PAR only) | | Experiment (PAR + NIR) | |
| --- | --- | --- | --- | --- |
|  | Flowers | Buds | Flowers | Buds |
|  | 3 | 5 | 1 | 4 |
|  | 1 | 2 | 4 | 3 |
|  | 2 | 4 | 7 | 5 |
|  | 4 | 5 | 8 | 5 |
|  | 5 | 4 | 5 | 8 |
| average | 3 | 3.8 | 5 | 5 |

FIG. 13b shows effect of the combination of PAR and NIR lights on fresh weight of cucumber plants at the end of the experiment (3 months). The fresh weight of the plants increased by 25%.

Example 3. Combination of NIR and White Light Improves Flowering of Geranium Geranium plants were exposed to either white light only (PAR of 400 nm-700 nm) or NIR of 800 nm to 950 nm with an average peak of 850 nm-880 nm and white light (PAR). The light/dark period was 16 h/8 h. The plants were exposed to these lighting conditions for 60 days.

The flowering of the plants exposed to the NIR+white light started on average 3 days earlier than the flowering of the plants with white light only. Moreover, the flowers of NIR+white light illuminated plants lasted fully open on average 3-5 days longer than the flowers of the plants illuminated with white light only.

Example 4. Combination of NIR and White Light in Hydroponic Culture of Strawberries Strawberry plantlets are grown on hydroponic culture. The plants are illuminated with photosynthetically active radiation in combination with NIR of 800 nm to 950 nm with a peak of 850 nm-880 nm. The day/night cycle is 16/8 h. The dry biomass of the plants is measured once a day for a period of 30 days. Preliminary experiments indicate that the plants grown under PAR with 10% of NIR are expected to show the largest accumulation of dry mass. PAR plus 5% or 25% of NIR are expected to show a higher accumulation rate of dry mass than the PAR only grown plants. However, the plants grown under PAR plus 5% NIR or PAR plus 25% NIR are expected to show less biomass accumulation than the plants grown under PAR plus 10% of NIR. The plants grown under PAR with 50% of NIR did not show any improvement compared to the plants grown under PAR.

TABLE 2

Effect of addition of NIR to PAR on growth of strawberries in hydroponics showing dry biomass accumulation at 16 h/8 h daylight cycle. The results represent the growth at the end of the experimental period.

| PAR | PAR with 5-7% of NIR | PAR with 10% of NIR | PAR with 25% of NIR | PAR with 50% of NIR |
| --- | --- | --- | --- | --- |
| 100% | 131% | 140% | 125-130% | 100-105% |

Example 5. Combination of NIR and PAR for Use with In Vitro Plant Propagation NIR and PAR can help to accelerate growth of plantlets in the case of in vitro plant propagation. An addition of UV-B of 280 to 315 nm and 5% violet of 405 nm provides some level of disinfection (2-3 log reduction of various pathogenic bacteria and fungi) and makes the plant materials pathogen-free. As a result of this lighting application, the plantlets will grow better and yield healthier plants. This combination of NIR and PAR lighting is also expected to improve the development of plantlets from genetically modified explants.

Nodal explants comprising 2-3 buds from a greenhouse and in vitro cultured avocado (*Persea amaricana* Mill), were cultured in solid in vitro lab media designed for in vitro plant multiplication. Explants were in transparent vessels and kept in a growth chamber. Two light treatments were tested: cool light from the in vitro lab and NIR (2 Strips with NIR emitters of 870 nm and 940 nm). The application of NIR accelerated the growth of plantlets.

Example 6. Stimulation of Early Growth Stage of Bulbiferous Plants

Dormant bulbs of tulips, amaryllis and daffodils are subjected to a combination of NIR and PAR lights at room temperature for day/night period of 12/12 hours. Control bulbs are subjected to PAR light only. The first green leaves emerge several days earlier from bulbs treated with a combination of NIR and PAR as compared to bulbs treated with PAR only.

Example 7. Stimulation of Growth of Crop Plants

Ten days old organic barley, oat and wheat seedlings or 'Cereals' were planted in 2"×4" pots and alfalfa sprouts in plastic containers. Light was adjusted 6" above the plants. Control light is LED T8 tube of 6000K (as a source of PAR), NIR 7% of power output+PAR, LED T8 tube of 6000K and NIR 50% of power output+PAR (LED T8tube of 6000K). Plant growth was monitored as total biomass accumulation. Growth was stimulated with a low percentage of NIR (31% increase in biomass accumulation with 7% of NIR). (FIG. 12) High percentage of NIR (approx. 50%) did not show any significant benefits in plant growth in these tests. (FIG. 12)

Example 8. Stimulation of Growth of Chrysanthemum, Peppermint Plants and Tomato Plants Plastic pots with artificial compost soil mix having plantlets of Chrysanthemum coming from plant tissue were placed in greenhouse tunnel covered by a plastic for growing. PAR and NIR illumination was provided to the plants from about 20 cm distance. A control treatment was placed in a separate compartment of the tunnel. Plant growth was measured at weeks 3 and 5, and plant height, number of leaves per plant and plant survival was be registered at that time. The difference in plant growth between control and NIR-PAR treated plants was 25%-30% in favor of the NIR+PAR treatment.

FIG. 14 shows the effect of peppermint plant growth under a source of PAR only (plant on the left) and under grow light with PAR+NIR (2 plants on right). FIG. 14 shows the effect of the treatment light (PAR and NIR as described in example 2) on the fresh and dry weight of peppermint plants.

FIGS. 16 and 17 demonstrate the positive effect of the treatment light (PAR and NIR as described in example 2) on fresh weight and height of tomato plants, respectively.

Example 9. Stimulation of Growth of Bell Pepper Fruits

Bell pepper plants cv. California Wonder where grown under treatment light (PAR and NIR as described in example 2) and control light (PAR only). The average fresh weight of the plants increased as is shown in FIG. 15c. The treatment light (PAR and NIR) clearly increased the size of the pepper fruits. This is shown in FIGS. 15a and 15b.

Example 10. A Lighting System for Growing Tomatoes in a Greenhouse

A lighting system including LED lamps providing near infrared (840-960 nm), red light (660 nm), blue light (450 nm) and white light with photosynthetically active radiation profile between 400 and 700 nm. The lighting system is programmed for example as follows:

| Hour Time | Colors | | | |
|---|---|---|---|---|
| | NIR | RED | BLUE | WHITE |
| 6:00-7:00 AM | OFF | OFF | ON | ON |
| 7:00-9:00AM | ON | ON | ON | ON |
| 9:00 AM-6:00PM | ON | ON | ON | ON |
| 6:00-8:00 PM | ON | ON | ON | ON |
| 8:00-9:00 PM | OFF | ON | ON | ON |
| 9:00-11:00 PM | OFF | ON | ON | ON |
| 11:00 PM-12:AM | ON | ON | ON | OFF |
| 12:00-6:00 AM | OFF | OFF | OFF | OFF |
| 6:00 AM | OFF | OFF | ON | ON |

Accordingly, the plants are illuminated with NIR during early morning hours and late evening hours in combination with red light and/or photosynthetically active light. The plants are exposed to blue light in combination with the photosynthetically active white light during late morning, daytime and early evening. According to one preferred schedule the photosynthetically active light is on between 7 AM and 10 PM. The plants are without any light between 12 to 5:30 AM. The plants are exposed to NIR between 6.00-8.30 in the morning and 8.00-11.30 PM. This light cycle improves the growth of the tomato plants. The dry mass as well as the production of fruits is higher in these plants as compared with plants otherwise having the same light conditions except that they do not receive the NIR.

What is claimed is:

1. A method for stimulating plant production as compared to a control, the method comprising illuminating a plant simultaneously with photosynthetically active radiation (PAR) having wavelengths in a range from 400 nm to 700 nm and near infrared radiation (NIR) having wavelengths in a range from 800 to 950 nm with an emission peak at a range of 850-880 nm, wherein radiant output of the NIR is 5-15% of the total radiant output and wherein the control is plant production under illumination with the PAR wavelengths only and without the NIR wavelengths.

2. The method according to claim 1, wherein the PAR is a combination of warm white light (3000-3500K) and cold white light (5000-7000K) of the wavelengths range 400 nm-700 nm.

3. The method according to claim 2, wherein the plant is illuminated additionally with UV-A, or UV-B, or with their combination.

4. The method of claim 1, wherein the plant is an edible plant.

5. The method claim 1, wherein the plant is a flowering species.

6. The method of claim 1, wherein the plant is an in vitro plant.

* * * * *